US009885404B2

(12) United States Patent
Takahashi et al.

(10) Patent No.: US 9,885,404 B2
(45) Date of Patent: Feb. 6, 2018

(54) POWER TRANSFER DEVICE

(71) Applicant: AISIN AW CO., LTD., Anjo-shi, Aichi-ken (JP)

(72) Inventors: Yusuke Takahashi, Anjo (JP); Nobukazu Ike, Kariya (JP); Osamu Murai, Toyota (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 224 days.

(21) Appl. No.: 14/899,353

(22) PCT Filed: Jul. 14, 2014

(86) PCT No.: PCT/JP2014/068711
§ 371 (c)(1),
(2) Date: Dec. 17, 2015

(87) PCT Pub. No.: WO2015/005492
PCT Pub. Date: Jan. 15, 2015

(65) Prior Publication Data
US 2016/0138692 A1 May 19, 2016

(30) Foreign Application Priority Data

Jul. 12, 2013 (JP) ................................. 2013-147043
Jul. 12, 2013 (JP) ................................. 2013-147044
Jul. 12, 2013 (JP) ................................. 2013-147045

(51) Int. Cl.
*F16H 63/00* (2006.01)
*F16H 41/04* (2006.01)
(Continued)

(52) U.S. Cl.
CPC ............. *F16H 41/04* (2013.01); *F16H 41/30* (2013.01); *F16H 47/02* (2013.01); *F16H 3/663* (2013.01);
(Continued)

(58) Field of Classification Search
CPC .......... F01D 25/18; F01D 25/20; F01D 15/08; F05D 2260/4031; F05D 2260/406;
(Continued)

(56) References Cited

U.S. PATENT DOCUMENTS

2004/0093478 A1  5/2004  Kwon et al.
2005/0255954 A1  11/2005  Ishikawa et al.
(Continued)

FOREIGN PATENT DOCUMENTS

JP  04-337151 A  11/1992
JP  2004-146827 A  5/2004
(Continued)

OTHER PUBLICATIONS

International Search Report for PCT/JP2014/068711 dated Oct. 7, 2014 [PCT/ISA/210].
(Continued)

*Primary Examiner* — Michael Leslie
*Assistant Examiner* — Daniel Collins
(74) *Attorney, Agent, or Firm* — Sughrue Mion, PLLC

(57) ABSTRACT

A front support includes a second boss portion which extends toward a chain drive mechanism and to which a stator shaft is fixed. The second boss portion is inserted into a tubular portion of an impeller hub through a drive sprocket. An oil passage that communicates with a fluid transmission chamber is defined between the inner peripheral surface of the tubular portion and the outer peripheral surface of the stator shaft. A seal member that restricts an inflow of working oil from the oil passage is interposed between the tubular portion and the second boss portion. A shaft-side oil groove and a recessed portion which communicate with an in-case oil passage formed in the front support and the oil passage are formed between the second boss portion and the stator shaft.

10 Claims, 6 Drawing Sheets

(51) Int. Cl.
*F16H 41/30* (2006.01)
*F16H 47/02* (2006.01)
F16H 57/04 (2010.01)
F16H 3/66 (2006.01)

(52) U.S. Cl.
CPC .... *F16H 57/0441* (2013.01); *F16H 2200/006* (2013.01); *F16H 2200/0086* (2013.01); *F16H 2200/2007* (2013.01); *F16H 2200/2023* (2013.01); *F16H 2200/2082* (2013.01); *F16H 2200/2097* (2013.01)

(58) Field of Classification Search
CPC .......... F16H 41/04; F16H 41/30; F16H 47/02; F16H 2200/0086; F16H 2200/2007
USPC .................................. 416/180, 197 C; 60/431
See application file for complete search history.

(56) References Cited

U.S. PATENT DOCUMENTS

| 2011/0132141 A1 | 6/2011 | Mizuno et al. |
| 2013/0123053 A1 | 5/2013 | Haupt et al. |
| 2013/0149110 A1 | 6/2013 | Pummell et al. |

FOREIGN PATENT DOCUMENTS

| JP | 2004-286144 A | 10/2004 |
| JP | 2005-325979 A | 11/2005 |
| JP | 2009-127672 A | 6/2009 |
| WO | 2010/125640 A1 | 11/2010 |
| WO | 2011/108316 A1 | 9/2011 |

OTHER PUBLICATIONS

Written Opinion for PCT/JP2014/068711 dated Oct. 7, 2014 [PCT/ISA/237].

FIG. 2

|   |      | C-1 | C-2 | C-3 | C-4 | B-1 | B-2 | F-1 |
|---|------|-----|-----|-----|-----|-----|-----|-----|
| D | 1st  | ○   |     |     |     |     | ●   | ○   |
|   | 2nd  | ○   |     |     |     | ○   |     |     |
|   | 3rd  | ○   |     | ○   |     |     |     |     |
|   | 4th  | ○   |     |     | ○   |     |     |     |
|   | 5th  | ○   | ○   |     |     |     |     |     |
|   | 6th  |     | ○   |     | ○   |     |     |     |
|   | 7th  |     | ○   | ○   |     |     |     |     |
|   | 8th  |     | ○   |     |     | ○   |     |     |
| REV1 |   |     |     | ○   |     |     | ○   |     |
| REV2 |   |     |     |     | ○   |     | ○   |     |

※ ○: ENGAGED, ●: ENGAGED WITH ENGINE BRAKE IN OPERATION

POWER TRANSFER DEVICE

CROSS REFERENCE TO RELATED APPLICATIONS

This application is a U.S. National Stage of International Application No. PCT/JP2014/068711 filed Jul. 14, 2014, claiming priority based on Japanese Patent Application Nos. 2013-147043, 2013-147044, 2013-147045 filed Jul. 12, 2013, the contents of all of which are incorporated herein by reference in their entirety.

TECHNICAL FIELD

The present disclosure relates to a power transfer device.

BACKGROUND ART

There has hitherto been known a power transfer device that includes: a torque converter (fluid transmission device) that includes a pump impeller connected to an engine (motor) and a turbine runner connected to an input shaft of a speed change mechanism; an oil pump driven by power from the engine; a chain system (chain drive mechanism) that includes a drive sprocket coupled to the pump impeller of the torque converter via a torque converter sleeve, a driven sprocket coupled to an oil pump drive shaft, and a chain wound between the drive sprocket and the driven sprocket; a stator shaft that supports the input shaft of the speed change mechanism; a torque converter housing that houses the torque converter; and a center support which is attached inside a transmission case that houses the speed change mechanism and to which the stator shaft is fixed (see Patent Document 1, for example).

In the power transfer device, the drive sprocket of the chain system is rotatably supported by the stator shaft, and the pump impeller of the torque converter is rotatably supported by the torque converter housing via the torque converter sleeve. The power transfer device additionally includes first, second, and third oil passages that supply oil (working oil) from an oil passage formed in the center support to the torque converter. The first oil passage is formed inside the input shaft. The second oil passage is constituted of a space defined by the input shaft and the stator shaft. The third oil passage is formed on the outer peripheral side of the drive sprocket so as not to interfere with the track of the chain, and composed of an inlet flow path that extends in the axial direction from the center support, a communication flow path formed in the torque converter housing, a hole and a groove formed in a bearing between the torque converter housing and the torque converter sleeve, an outlet flow path formed in the torque converter sleeve, and so forth.

There is also known a power transfer device that includes: a torque converter that transfers power from an engine (motor) to an input shaft of an automatic transmission; an oil pump driven by power from the engine; an oil pump drive mechanism (chain drive mechanism) that includes a first sprocket (drive sprocket) coupled to an impeller shell (pump impeller) of the torque converter via a torque converter sleeve, a second sprocket (driven sprocket) provided on an oil pump drive shaft, and a chain wound around the first sprocket and the second sprocket; a stator shaft that rotatably supports the input shaft of the automatic transmission; and a unit housing that includes a torque converter housing that houses the torque converter, a cover to which the stator shaft is fixed, and so forth (see Patent Document 2, for example).

In the power transfer device, the impeller shell (torque converter sleeve) of the torque converter is rotatably supported by the stator shaft via a first bush (bearing), and the first sprocket of the oil pump drive mechanism is rotatably supported by the stator shaft via a second bush (bearing).

In addition, there is also known a power transfer device that includes: a bush disposed between a tubular portion of a rotary member coupled to a converter cover of a pump impeller and a projecting portion of a transaxle case that serves as a stationary member so as to seal a pressurized oil passage; a drive-side sprocket of a transmission mechanism coupled to the outer peripheral side of an intermediate portion in the tubular portion of the rotary member; and a bearing disposed on the outer peripheral side of the bush and the projecting portion of the transaxle case so as to rotatably hold the drive-side sprocket (see Patent Document 3, for example). In the power transfer device, the drive-side sprocket includes a disk-shaped portion spline-fitted to the tubular portion of the rotary member, and a tubular portion that extends in the axial direction from an outer end portion of the disk-shaped portion, and the bearing is disposed between the tubular portion and the projecting portion of the transaxle case.

RELATED-ART DOCUMENTS

Patent Documents

[Patent Document 1] International Patent Application Publication No. 2010/125640
[Patent Document 2] Japanese Patent Application Publication No. 2005-325979 (JP2005-325979 A)
[Patent Document 3] Japanese Patent Application Publication No. 2004-286144 (JP2004286144 A)

SUMMARY

In the case where an oil passage that extends from the center support toward the torque converter while bypassing the drive sprocket is formed on the outer side of the drive sprocket as in the power transfer device described in Patent Document 1, it is necessary to increase the wall thickness of the center support and the torque converter housing in order to form the inlet flow pass and the communication flow path, which increases the size and the weight of the power transfer device. In addition, it is necessary to provide a seal member between the center support and the torque converter housing, to machine a hole and a groove in the bearing, and so forth, which leads to an increase in number of components and number of man-hours for assembly due to complication of the oil passage structure to incur a cost increase.

In the power transfer device described in Patent Document 2, meanwhile, when working oil in the torque converter flows from an oil passage between the torque converter sleeve and the stator shaft toward the first sprocket via the first bush, the first sprocket may receive a hydraulic pressure to become unstable in position in the axial direction. Thus, a seal member that restricts an inflow of working oil from the oil passage toward the first sprocket is preferably provided between the torque converter sleeve and the stator shaft. If the seal member is disposed in addition to the first and second bushes between the torque converter sleeve and the stator shaft in the power transfer device according to the related art, however, the interposition of the seal member may increase the axial length of the stator shaft, and hence may increase the axial length of the entire power transfer device. In the power transfer device described in Patent Document 3, further, the size of the drive-side sprocket may be increased because of the structure, which makes it difficult to reduce the size of the entire device.

It is therefore a main object to simplify the structure of an oil passage that supplies and discharges working oil to and from a fluid transmission device while bypassing a drive sprocket of a chain drive mechanism that transfers power to an oil pump, and to achieve a reduction in size and weight of a power transfer device and a cost reduction due to a reduction in number of components and number of man-hours for assembly.

The present disclosure provides a power transfer device comprising: a fluid transmission device that includes a pump impeller connected to a motor, a turbine runner connected to an input shaft of a transmission, and a fluid transmission chamber in which power is transferred via working oil between the pump impeller and the turbine runner; an oil pump driven by power from the motor; a chain drive mechanism that includes a drive sprocket coupled to the pump impeller of the fluid transmission device, a driven sprocket attached to a rotary shaft of the oil pump, and a chain wound around the drive sprocket and the driven sprocket; a sleeve member that rotatably supports the input shaft of the transmission; and a case that houses the fluid transmission device, the transmission, and the oil pump, in which:

the case includes a first support portion and a second support portion disposed on the fluid transmission device side and on the transmission side, respectively, across the chain drive mechanism;

the second support portion includes a cylindrical boss portion that extends toward the chain drive mechanism and that defines a through hole to which the sleeve member is fixed;

the drive sprocket is fitted to a tubular portion of an impeller hub, which is fixed to the pump impeller, so as to be relatively non-rotatable;

the boss portion of the second support portion is inserted into the tubular portion of the impeller hub through the drive sprocket;

a first oil passage that communicates with the fluid transmission chamber is defined between an inner peripheral surface of the tubular portion of the impeller hub and an outer peripheral surface of the sleeve member;

a seal member that restricts an inflow of working oil from the first oil passage is disposed between the tubular portion of the impeller hub and the boss portion; and a second oil passage that communicates with a support portion oil passage formed in the second support portion and the first oil passage is formed between the boss portion and the sleeve member.

In the power transfer device, the first support portion of the case and the second support portion of the case are disposed on the fluid transmission device side and on the transmission side, respectively, across the chain drive mechanism. The drive sprocket of the chain drive mechanism is fitted to the tubular portion of the impeller hub, which is fixed to the pump impeller, so as to be relatively non-rotatable. The second support portion includes the cylindrical boss portion which extends toward the chain drive mechanism and which defines the through hole to which the sleeve member is fixed. The boss portion is inserted into the tubular portion of the impeller hub through the drive sprocket. The first oil passage which communicates with the fluid transmission chamber is defined between the inner peripheral surface of the tubular portion of the impeller hub and the outer peripheral surface of the sleeve member.

The seal member which restricts an inflow of working oil from the first oil passage is disposed between the tubular portion of the impeller hub and the boss portion. The second oil passage which communicates with the support portion oil passage which is formed in the second support portion and the first oil passage is formed between the boss portion and the sleeve member. Consequently, oil passages that connect between the fluid transmission chamber and the support portion oil passage of the second support portion, that is, the first oil passage and the second oil passage, can be formed between the drive sprocket and the impeller hub and the sleeve member in the radial direction. As a result, it is no longer necessary that an oil passage that connects between the fluid transmission chamber and the support portion oil passage should be formed on the outer side of the drive sprocket, which makes it possible to suppress an increase in wall thickness of the case (second support portion) along with formation of the oil passage, and an increase in number of components and number of man-hours for assembly due to provision of a seal member and machining of a bearing. Thus, it is possible to simplify the structure of an oil passage that supplies and discharges working oil to and from the fluid transmission device while bypassing the drive sprocket of the chain drive mechanism which transfers power to the oil pump, and to achieve a reduction in size and weight of the power transfer device and a cost reduction due to a reduction in number of components and number of man-hours for assembly. With the power transfer device, further, it is possible to restrict an inflow of working oil from the first oil passage toward the drive sprocket using the seal member. Thus, it is possible to suitably suppress application of a hydraulic pressure to the drive sprocket, which stably maintains the position of the drive sprocket in the axial direction.

The pump impeller may be rotatably supported by the first support portion via a bearing disposed on an outer peripheral side of the tubular portion of the impeller hub; and the seal member may be disposed so as to overlap the bearing on an inner side of the bearing in a radial direction. That is, with the boss portion of the second support portion inserted into the tubular portion of the impeller hub through the drive sprocket, and with the pump impeller rotatably supported by the first support portion via the bearing which is disposed on the outer peripheral side of the tubular portion, the seal member and the bearing can be disposed so as to overlap each other as seen in the radial direction. Consequently, the axial length of the power transfer device can be shortened with the drive sprocket, the bearing, and the seal member not arranged in the axial direction.

The power transfer device may further include an in-shaft oil passage formed in the input shaft so as to communicate with the fluid transmission chamber, a communication oil passage defined between an outer peripheral surface of the input shaft and an inner peripheral surface of the sleeve member so as to communicate between a second support portion oil passage formed in the second support portion and the in-shaft oil passage, a second seal member disposed between the input shaft and the sleeve member so as to restrict leakage of working oil from the communication oil passage, and a bush disposed on the first oil passage side with respect to the second seal member between the input shaft and the sleeve member so as to restrict leakage of working oil from the communication oil passage; end portions of the input shaft and the sleeve member on the first oil passage side with respect to the second seal member may be reduced in diameter; and the second oil passage may include a shaft-side oil groove formed in the outer peripheral surface of the sleeve member so as to communicate with the fluid transmission chamber, and a recessed portion formed in an inner peripheral surface of the second support portion so as to communicate with the support portion oil passage.

Consequently, the fluid transmission chamber of the fluid transmission device communicates with the support portion oil passage of the second support portion via the first and second oil passages, and communicates with the second support portion oil passage of the second support portion via the in-shaft oil passage and the communication oil passage. Thus, working oil can be supplied from the second support portion to the fluid transmission chamber, and working oil from the fluid transmission chamber can be returned to the second support portion. In addition, the support portion oil passage and the fluid transmission chamber can communicate with each other via the recessed portion which is formed in the inner peripheral surface of the second support portion and the shaft-side oil groove which is formed in the outer peripheral surface of the sleeve member. Thus, oil grooves can be omitted from the boss portion as much as possible. Further, with end portions of the input shaft and the sleeve member on the first oil passage side with respect to the second seal member reduced in diameter, a sufficient oil passage cross-sectional area of the second oil passage (shaft-side oil groove) can be secured even if oil grooves are omitted from the boss portion. As a result, the boss portion can be thin-walled to suppress an increase in diameter of the drive sprocket and the surrounding members, and hence to suppress an increase in size of the power transfer device.

The power transfer device may further include a clutch that couples and decouples the motor and the input shaft of the transmission to and from each other, and a second in-shaft oil passage formed in the input shaft so as to communicate with an engagement oil chamber of the clutch; the second support portion may be provided with a third support portion oil passage that communicates with the second in-shaft oil passage via an oil hole formed in the sleeve member; and the second seal member may restrict a flow of working oil between: a communication portion between the second in-shaft oil passage and the oil hole of the sleeve member; and the communication oil passage. Consequently, working oil can be supplied and discharged from the second support portion to the engagement oil chamber of the clutch.

The second support portion may include a flange portion that includes the support portion oil passage; the boss portion may extend from the flange portion toward the chain drive mechanism; and the recessed portion may be formed in an inner peripheral surface of the flange portion so as to communicate with the support portion oil passage.

BRIEF DESCRIPTION OF THE DRAWINGS

FIG. 2 is an operation table illustrating the relationship between shift speeds of an automatic transmission 25 included in the power transfer device 20 of FIG. 1 and the respective operating states of clutches and brakes.

Now, an exemplary embodiment will be described with reference to the drawings.

Figure 1:
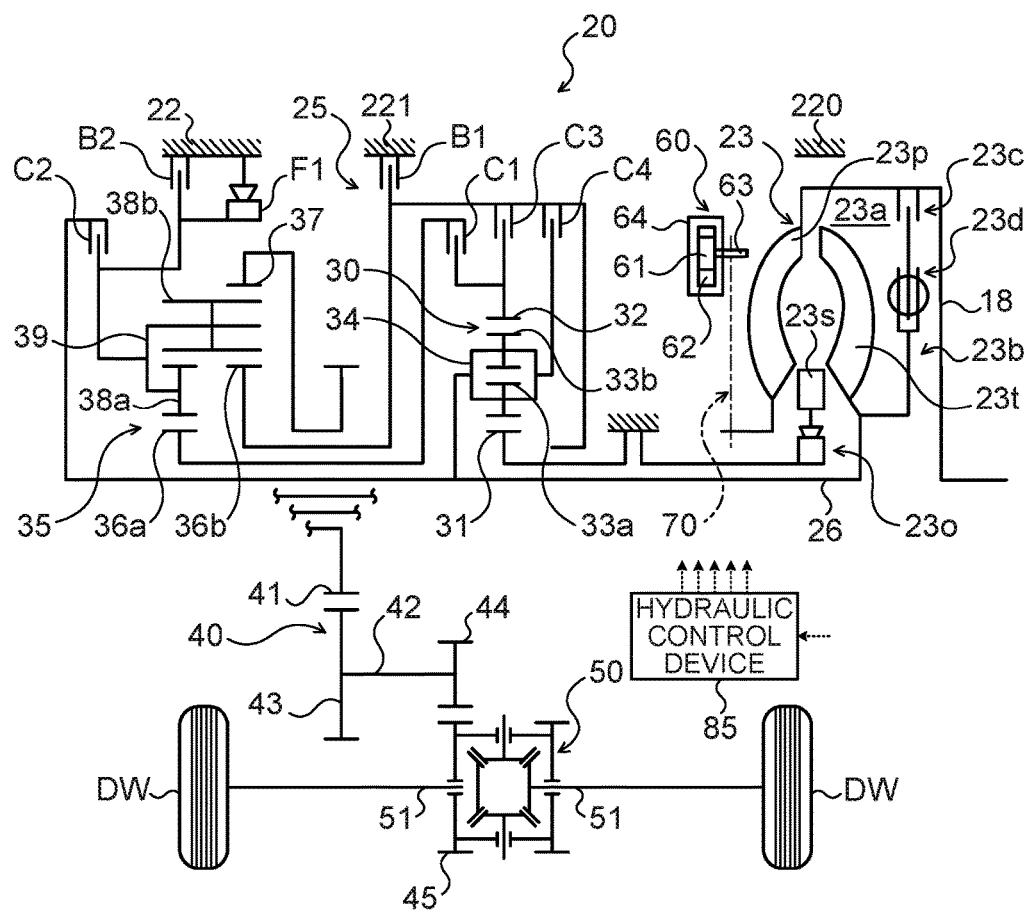
FIG. 1 illustrates a schematic configuration of a power transfer device 20 according to an exemplary embodiment.

FIG. 1 illustrates a schematic configuration of a power transfer device 20 according to an exemplary embodiment. The power transfer device 20 illustrated in the drawing is connected to a crankshaft of an engine (not illustrated) mounted on a front-drive automobile, and can transfer power from the engine to left and right drive wheels (front wheels) DW. As illustrated in the drawing, the power transfer device 20 includes a transmission case 22 that includes a converter housing 220 and a transaxle case 221, a fluid transmission device (starting device) 23 housed in the converter housing 220, an automatic transmission 25 housed in the transaxle case 221, a gear mechanism 40, a differential mechanism (differential gear) 50, an oil pump 60, a chain drive mechanism 70 that transfers power from the engine to the oil pump 60, a hydraulic control device 85 that regulates the pressure of working oil (ATF) discharged from the oil pump 60 to output the working oil, and so forth.

The fluid transmission device 23 is structured as a torque converter that has a torque amplification function. As illustrated in FIG. 1, the fluid transmission device 23 includes a pump impeller 23$p$ on the input side connected to the crankshaft of the engine via a front cover 18 that serves as an input member, a turbine runner 23$t$ on the output side connected to an input shaft 26 of the automatic transmission 25, a stator 23$s$ disposed on the inner side of the pump impeller 23$p$ and the turbine runner 23$t$ to rectify a flow of working oil from the turbine runner 23$t$ to the pump impeller 23$p$, a one-way clutch 23$o$ that restricts rotation of the stator 23$s$ to one direction, a lock-up clutch 23$c$, a damper mechanism 23$d$, and so forth. The fluid transmission device 23 may be structured as a fluid coupling not including the stator 23$s$.

The lock-up clutch 23$c$ selectively establishes and releases lock-up in which the pump impeller 23$p$ and the turbine runner 23$t$, that is, the front cover 18 (motor) and the input shaft 26 of the automatic transmission 25, are mechanically coupled to each other. The lock-up clutch 23$c$ is configured to establish and release lock-up in accordance with a difference pressure between a hydraulic pressure in a fluid transmission chamber 23$a$, in which power is transferred via working oil between the pump impeller 23$p$ and the turbine runner 23$t$, and a hydraulic pressure in a lock-up chamber 23$b$ that opposes the fluid transmission chamber 23$a$ via a lock-up piston. The lock-up clutch 23$c$ may be a hydraulic single-plate friction clutch, or may be a hydraulic multi-plate friction clutch.

The automatic transmission 25 is structured as an 8-speed transmission. As illustrated in FIG. 1, the automatic transmission 25 includes a double-pinion type first planetary gear mechanism 30, a Ravigneaux type second planetary gear mechanism 35, and four clutches C1, C2, C3, and C4, two brakes B1 and B2, and a one-way clutch F1 that change a power transfer path from the input side to the output side.

The first planetary gear mechanism 30 includes a sun gear 31 which is an externally toothed gear, a ring gear 32 which is an internally toothed gear disposed concentrically with the sun gear 31, and a planetary carrier 34 that rotatably and revolvably holds a plurality of sets of two pinion gears 33$a$ and 33$b$ meshed with each other, one of the pinion gears 33$a$ and 33$b$ being meshed with the sun gear 31 and the other being meshed with the ring gear 32. As illustrated in the drawing, the sun gear 31 of the first planetary gear mechanism 30 is stationary with respect to the transaxle case 221, and the planetary carrier 34 of the first planetary gear mechanism 30 is connected so as to be rotatable together with the input shaft 26. In addition, the first planetary gear mechanism 30 is structured as a so-called speed reduction gear, and reduces the speed of power transferred to the planetary carrier 34 as an input element to output the power from the ring gear 32 as an output element.

The second planetary gear mechanism 35 includes a first sun gear 36a and a second sun gear 36b which are each an externally toothed gear, a ring gear 37 which is an internally toothed gear, a plurality of short pinion gears 38a meshed with the first sun gear 36a, a plurality of long pinion gears 38b meshed with the second sun gear 36b and the plurality of short pinion gears 38a and meshed with the ring gear 37, and a planetary carrier 39 that rotatably and revolvably holds the plurality of short pinion gears 38a and the plurality of long pinion gears 38b. The ring gear 37 of the second planetary gear mechanism 35 functions as an output member of the automatic transmission 25. Power transferred from the input shaft 26 to the ring gear 37 is transferred to the left and right drive wheels DW via the gear mechanism 40, the differential gear 50, and a drive shaft 51. In addition, the planetary carrier 39 is supported by the transmission case 22 via the one-way clutch F1. The rotational direction of the planetary carrier 39 is restricted to one direction by the one-way clutch F1.

The clutch C1 is a multi-plate friction-type hydraulic clutch (friction engagement element) that has a hydraulic servo structured from a piston, a plurality of friction plates and mating plates, an oil chamber supplied with working oil, and so forth, and that is capable of fastening and unfastening the ring gear 32 of the first planetary gear mechanism 30 and the first sun gear 36a of the second planetary gear mechanism 35 to and from each other. The clutch C2 is a multi-plate friction-type hydraulic clutch that has a hydraulic servo structured from a piston, a plurality of friction plates and mating plates, an oil chamber supplied with hydraulic oil, and so forth, and that is capable of fastening and unfastening the input shaft 26 and the planetary carrier 39 of the second planetary gear mechanism 35 to and from each other. The clutch C3 is a multi-plate friction-type hydraulic clutch that has a hydraulic servo structured from a piston, a plurality of friction plates and mating plates, an oil chamber supplied with working oil, and so forth, and that is capable of fastening and unfastening the ring gear 32 of the first planetary gear mechanism 30 and the second sun gear 36b of the second planetary gear mechanism 35 to and from each other. The clutch C4 is a multi-plate friction-type hydraulic clutch that has a hydraulic servo structured from a piston, a plurality of friction plates and mating plates, an oil chamber supplied with working oil, and so forth, and that is capable of fastening and unfastening the planetary carrier 34 of the first planetary gear mechanism 30 and the second sun gear 36b of the second planetary gear mechanism 35 to and from each other.

The brake B1 is a hydraulic brake (friction engagement element) that is structured as a band brake or a multi-plate friction-type brake including a hydraulic servo, and that is capable of making the second sun gear 36b of the second planetary gear mechanism 35 stationary and movable with respect to the transmission case 22. The brake B2 is a hydraulic brake that is structured as a band brake or a multi-plate friction-type brake including a hydraulic servo, and that is capable of making the planetary carrier 39 of the second planetary gear mechanism 35 stationary and movable with respect to the transmission case 22. In addition, the one-way clutch F1 includes an inner race, an outer race, a plurality of sprags, and so forth, for example. The one-way clutch F1 transfers torque via the sprags when the outer race rotates in one direction with respect to the inner race, and allows the inner race and the outer race to rotate with respect to each other when the outer race rotates in the other direction with respect to the inner race. It should be noted, however, that the one-way clutch F1 may be of a roller type or the like, rather than the sprag type.

The clutches C1 to C4 and the brakes B1 and B2 operate with hydraulic oil supplied thereto and discharged therefrom by the hydraulic control device 85. FIG. 2 is an operation table illustrating the relationship between shift speeds of the automatic transmission 25 and the respective operating states of the clutches C1 to C4, the brakes B1 and B2, and the one-way clutch F1. The automatic transmission 25 provides first to eighth forward speeds and first and second reverse speeds when the clutches C1 to C4 and the brakes B1 and B2 are brought into the respective states illustrated in the operation table of FIG. 2. At least one of the clutches C1 to C4 and the brakes B1 and B2 may be a meshing engagement element such as a dog clutch.

The gear mechanism 40 includes: a counter drive gear 41 coupled to the ring gear 37 of the second planetary gear mechanism 35 of the automatic transmission 25; a counter driven gear 43 fixed to a counter shaft 42 that extends in parallel with the input shaft 26 of the automatic transmission 25 and meshed with the counter drive gear 41; a drive pinion gear (final drive gear) 44 integrally formed on (or fixed to) the counter shaft 42; and a differential ring gear (final driven gear) 45 meshed with the drive pinion gear 44 and coupled to the differential gear 50.

Figure 3:
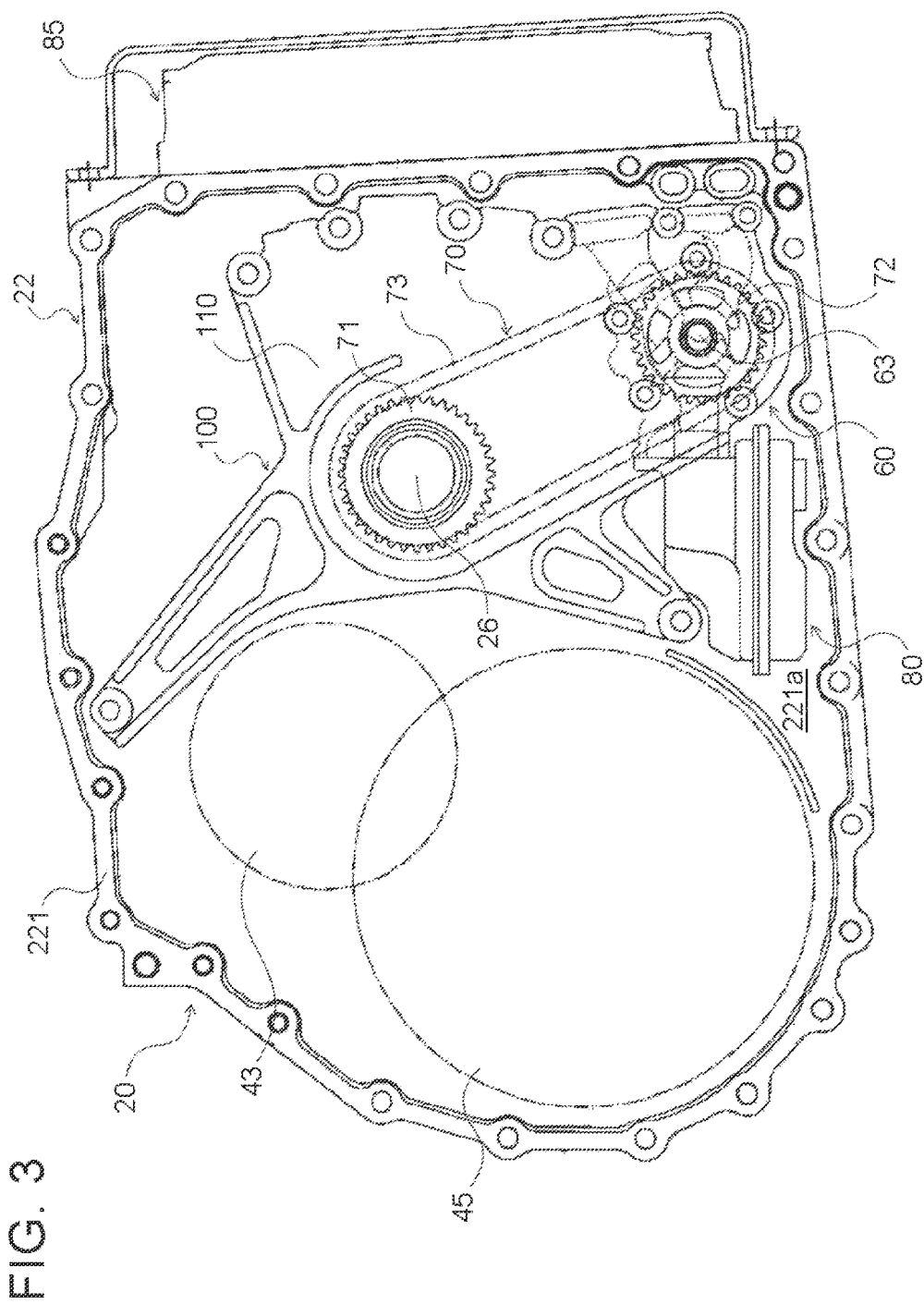
FIG. 3 illustrates a schematic configuration of the power transfer device 20.

The oil pump 60 is constituted as a gear pump that includes: an externally toothed gear (inner rotor) 61 that has a plurality of external teeth; an internally toothed gear (outer rotor) 62 that has a plurality of internal teeth, which are meshed with the external teeth of the externally toothed gear 61 and the number of which is larger than the total number of the external teeth by one, the internally toothed gear 62 being disposed eccentrically with respect to the externally toothed gear 61; a rotary shaft 63 attached to the externally toothed gear 61; and a pump housing 64 that houses the externally toothed gear 61 and the internally toothed gear 62. In the embodiment, as illustrated in FIG. 3, the oil pump 60 is disposed in the lower portion of the transaxle case 221, that is, at a side of the differential ring gear 45 of the gear mechanism 40, such that the rotary shaft 63 is positioned on an axis that is different from the input shaft 26 of the automatic transmission 25. The oil pump 60 is driven by power from the engine transferred to the rotary shaft 63 via the chain drive mechanism 70 which is coupled to the pump impeller 23p of the fluid transmission device 23 to suction working oil stored in a working oil storage portion 221a (see FIG. 3) formed in the lower portion of the transaxle case 221 to pump the working oil to the hydraulic control device 85. Consequently, the outside diameters of the rotary shaft 63, the externally toothed gear 61, and the internally toothed gear 62 can be reduced compared to a case where the rotary shaft 63 is disposed coaxially with the input shaft 26. Therefore, the size of the entire oil pump 60 can be reduced, and drag torque generated between the externally toothed gear 61 and the internally toothed gear 62 and the pump housing 64 can be reduced.

In addition, the power transfer device 20 includes a strainer 80 that filters the working oil suctioned from the working oil storage portion 221a by the oil pump 60. As illustrated in FIG. 3, the strainer 80 is disposed in the transaxle case 221 so as to be positioned at a side of the oil pump 60 on the differential ring gear 45 side, and opens in the working oil storage portion 221a and is connected to the oil pump 60. In this way, by disposing the oil pump 60 and the strainer 80 in a space at a side of the differential ring gear 45, which tends to be a dead space, the size of the power transfer device 20 can be reduced.

The hydraulic control device 85 includes a valve body that has a plurality of oil passages (not illustrated), a plurality of regulator valves and relay valves composed of the valve body and a spool and a spring (not illustrated), and a plurality of linear solenoid valves and on-off solenoid valves attached to the valve body to compose a hydraulic circuit together with an oil passage in the valve body, and so forth (none of which is illustrated). The hydraulic control device 85 regulates the pressure of working oil discharged from the oil pump 60 to supply the working oil to the fluid transmission device 23 and various hydraulic devices such as the clutches C1 to C3 and the brakes B1 and B2 included in the automatic transmission 25, and to supply the working oil as a lubricating/cooling medium to objects to be lubricated/cooled such as various types of bearings. In the embodiment, as illustrated in FIG. 3, the hydraulic control device 85 is attached to a side portion of the transaxle case 221 so as to be positioned opposite to the strainer 80 via the oil pump 60.

Figure 4:
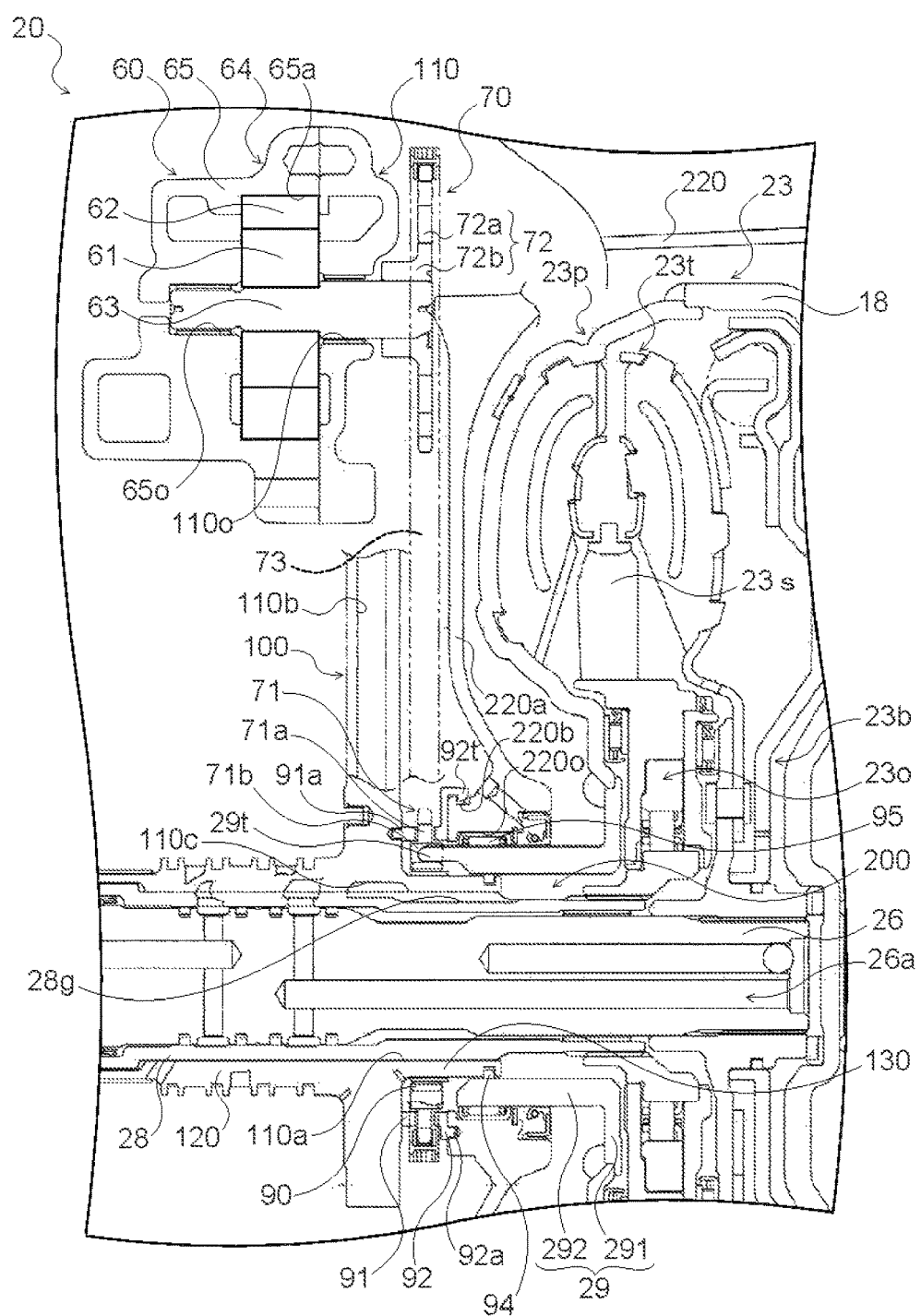
FIG. 4 is an enlarged view illustrating an essential portion of the power transfer device 20.
Figure 5:
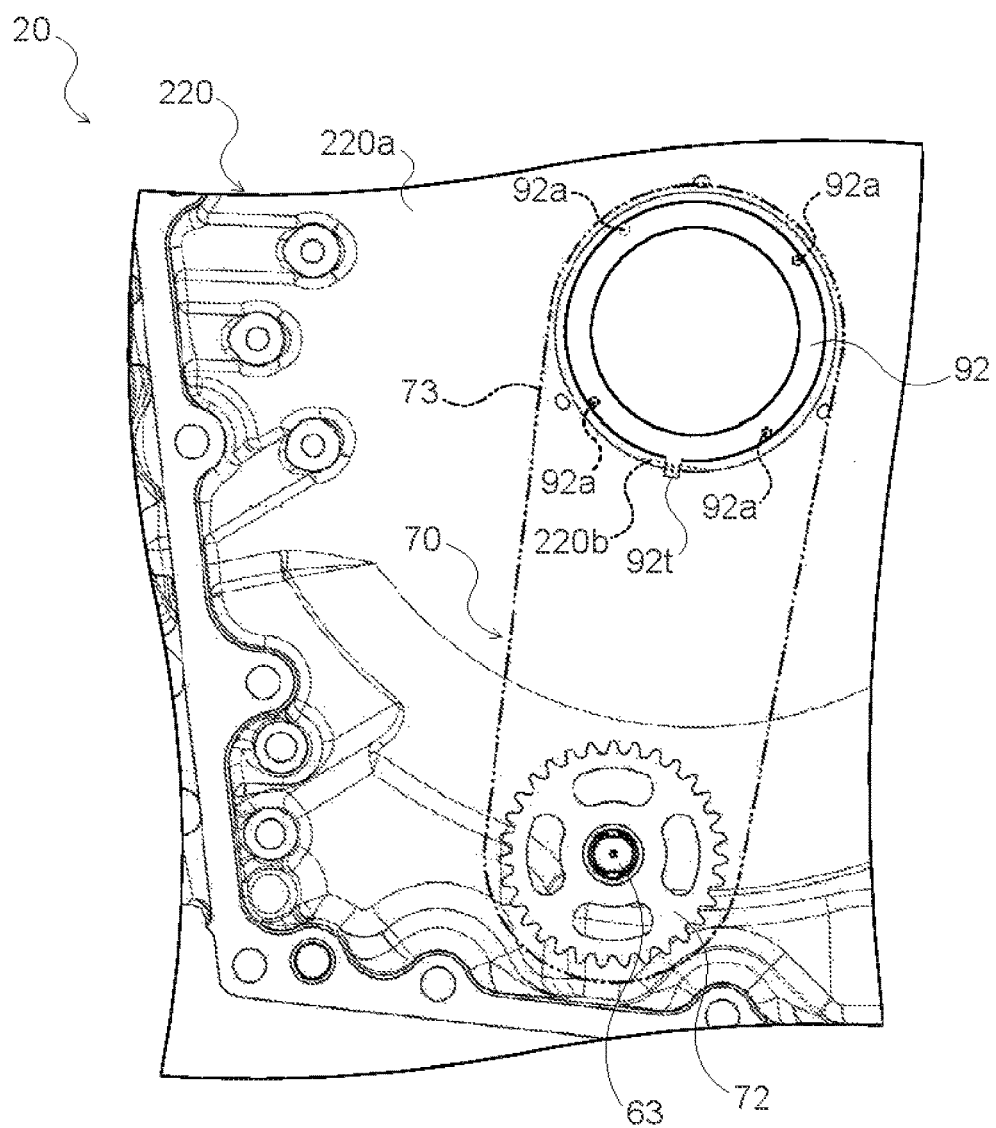
FIG. 5 is a partial enlarged view illustrating a part of the power transfer device 20.

Subsequently, an essential portion of the power transfer device 20 according to the embodiment will be described with reference to FIGS. 4 and 5. FIG. 4 illustrates a structure of peripheral parts of the fluid transmission device 23 which is included in the power transfer device 20, the oil pump 60, and the chain drive mechanism 70 which transfers power from the engine to the oil pump 60. In FIG. 5, for simplicity of illustration, a drive sprocket 71 of the chain drive mechanism 70 is not illustrated.

As illustrated in FIG. 4, the converter housing 220 which constitutes the transmission case 22 includes a sidewall portion 220a (first support portion) that extends in the radial direction of the fluid transmission device 23 and that has a through hole 220o that extends coaxially with the input shaft 26 of the automatic transmission 25. In addition, the transaxle case 221 which is fixed (coupled) to the converter housing 220 is integrated with a front support 100 (second support portion) that extends in the radial direction of the fluid transmission device 23. The sidewall portion 220a of the converter housing 220 is disposed on the fluid transmission device 23 side (right side in FIG. 4) of the chain drive mechanism 70. The front support 100 of the transaxle case 221 is disposed on the automatic transmission 25 side (left side in FIG. 4) of the chain drive mechanism 70. That is, the sidewall portion 220a and the front support 100 are opposite to each other via the chain drive mechanism 70.

The front support 100 includes: a flange portion 110 fastened to the transaxle case 221 via a plurality of bolts (not illustrated) to extend in the radial direction so as to be opposite to the sidewall portion 220a of the converter housing 220 in the transaxle case 221; a cylindrical first boss portion 120 that extends in the axial direction from the center portion of the flange portion 110 toward the automatic transmission 25 (left side in FIG. 4); and a cylindrical second boss portion 130 that extends in the axial direction from the center portion of the flange portion 110 toward the chain drive mechanism 70 (right side in FIG. 4). The front support 100 has a through hole 110a defined by the flange portion 110 and the first and second boss portions 120 and 130. A stator shaft 28 (sleeve member) that rotatably supports the input shaft 26 of the automatic transmission 25 is press-fitted (fixed) into the through hole 110a. Consequently, the input shaft 26 of the automatic transmission 25 is supported by the front support 100, that is, the transaxle case 221, via the stator shaft 28.

In the embodiment, the front support 100 is formed so as to compose a part of the pump housing 64 of the oil pump 60. That is, the pump housing 64 is composed of a pump body 65 that includes a gear housing chamber 65a that houses the externally toothed gear 61 and the internally toothed gear 62, and the flange portion 110 of the front support 100 which is fastened to the pump body 65 via a bolt (not illustrated) so as to cover the gear housing chamber 65a from the fluid transmission device 23 side (right side in FIG. 4). In addition, the pump body 65 is provided with a support hole 65o that rotatably supports one end of the rotary shaft 63 of the oil pump 60. Further, the flange portion 110 is provided with a support hole 110o that extends coaxially with the support hole 65o when the pump body 65 and the front support 100 are fastened to each other to rotatably support the other end of the rotary shaft 63. Consequently, the oil pump 60 is fixed to the transaxle case 221 such that the rotary shaft 63 is positioned on an axis that is different from the input shaft 26 of the automatic transmission 25 via the front support 100.

In addition, as illustrated in FIG. 4, the chain drive mechanism 70 which transfers power from the engine to the oil pump 60 includes the drive sprocket 71 which is coupled to the pump impeller 23p of the fluid transmission device 23 via an impeller hub 29, a driven sprocket 72 attached to the rotary shaft 63, and a chain 73 wound around the drive sprocket 71 and the driven sprocket 72.

The drive sprocket 71 is constituted as an annular gear member that has a plurality of gear teeth on the outer periphery, and includes a disk portion 71a that has the gear teeth and a boss portion 71b that supports the disk portion 71a and that has a center hole, for example. The drive sprocket 71 is rotatably supported by the second boss portion 130 of the front support 100 via a bearing 90 disposed in the center hole of the boss portion 71b. That is, the second boss portion 130 is inserted through the disk portion 71a (through hole) of the drive sprocket 71 via the bearing 90. In the embodiment, a sleeve that suppresses wear of the bearing 90 and the second boss portion 130 is interposed between the bearing 90 and the second boss portion 130.

In addition, an annular first washer 91 is disposed on the automatic transmission 25 side (left side in FIG. 4) of the drive sprocket 71 so as to be able to abut against an end surface of the disk portion 71a, and an annular second washer 92 is disposed on the fluid transmission device 23 side (right side in FIG. 4) of the drive sprocket 71 so as to be able to abut against an end surface of the disk portion 71a. The first washer 91 includes a plurality of protruding portions 91a to be fitted with corresponding hole portions formed in the flange portion 110 of the front support 100. The second washer 92 includes a plurality of protruding portions 92a to be inserted through corresponding hole portions formed in the sidewall portion 220a of the converter housing 220. Consequently, the first and second washers 91 and 92 can restrict movement of the drive sprocket 71 in the axial direction while restricting rotation of the first and second washers 91 and 92 in accompaniment with the drive sprocket 71.

In the embodiment, as illustrated in FIGS. 4 and 5, the second washer 92 includes an engagement hook 92t that is engageable with a recessed portion 220b formed in the sidewall portion 220a of the converter housing 220. Consequently, with the engagement hook 92t engaged with the recessed portion 220b of the converter housing 220, the second washer 92 is stably held by the converter housing 220, which allows the converter housing 220 which holds the second washer 92 to be assembled to the power transfer device 20 from the engine side toward the automatic transmission 25 side (from the right side toward the left side in FIG. 4). As a result, it is possible to improve the assemblability of the power transfer device 20.

The driven sprocket 72 is constituted as an annular gear member that has a plurality of gear teeth on the outer periphery, and includes a disk portion 72a that has the gear teeth and a boss portion 72b that extends in the axial direction from the disk portion 72a and that has a center hole, for example. The rotary shaft 63 of the oil pump 60 is fixed to the center hole of the boss portion 72b. The chain 73 is wound around the gear teeth formed on the outer peripheries of the drive sprocket 71 and the driven sprocket 72.

The impeller hub 29 which is coupled to the drive sprocket 71 of the chain drive mechanism 70 includes an annular portion 291 fixed to the pump impeller 23p of the fluid transmission device 23, and a tubular portion 292 that extends in the axial direction from the center portion of the annular portion 291. The tubular portion 292 of the impeller hub 29 includes a plurality of (in the embodiment, two) projecting portions 29t formed at an end portion on the front support 100 side. In addition, the boss portion 71b of the drive sprocket 71 is provided with a plurality of (in the embodiment, two) hole portions that are engageable with the projecting portions 29t. With the projecting portions 29t and the hole portions engaged with each other, the pump impeller 23p of the fluid transmission device 23 and the drive sprocket 71 are coupled so as to be rotatable together with each other. That is, the drive sprocket 71 is fitted to the tubular portion 292 of the impeller hub 29 so as to be relatively non-rotatable. Consequently, power from the engine can be transferred to the rotary shaft 63 of the oil pump 60 via the pump impeller 23p of the fluid transmission device 23, the impeller hub 29, the drive sprocket 71, the chain 73, and the driven sprocket 72 to rotationally drive the externally toothed gear 61 and the internally toothed gear 62.

Further, as illustrated in FIG. 4, the tubular portion 292 of the impeller hub 29 is rotatably supported by the inner peripheral surface of the through hole 220o of the converter housing 220 via a bearing 95 disposed on the outer peripheral side. Consequently, the pump impeller 23p of the fluid transmission device 23 is rotatably supported by the converter housing 220 via the impeller hub 29 and the bearing 95. As discussed above, the drive sprocket 71 of the chain drive mechanism 70 is rotatably supported by the second boss portion 130 of the front support 100 via the bearing 90. In this way, with the pump impeller 23p of the fluid transmission device 23 and the drive sprocket 71 supported by the converter housing 220 and the front support 100 which are different from the stator shaft 28, the size of the power transfer device 20 can be reduced with the stator shaft 28, which extends over a relatively long range in the axial direction of the power transfer device 20, thin-walled while adequately supporting the pump impeller 23p and the drive sprocket 71.

Subsequently, the oil passage structure for supplying and discharging working oil from the hydraulic control device 85 to the fluid transmission device 23 will be described. In the power transfer device 20 according to the embodiment, as illustrated in FIG. 4, an oil passage 26a (in-shaft oil passage) that communicates with the lock-up chamber 23b of the fluid transmission device 23 and that is connected to the hydraulic control device 85 is formed inside the input shaft 26 of the automatic transmission 25. The oil passage 26a is used as a lock-up off oil passage that supplies a hydraulic pressure from the hydraulic control device 85 to the lock-up chamber 23b of the fluid transmission device 23. As illustrated in FIG. 4, the oil passage 26a of the input shaft 26 includes a radial oil passage formed in the input shaft 26, and the radial oil passage is connected to the hydraulic control device 85 via an oil hole formed in the stator shaft 28 and an in-case oil passage (second support portion oil passage) (not illustrated) formed in the front support.

An in-case oil passage 110b (support portion oil passage) connected to the hydraulic control device 85 via an oil passage (not illustrated) formed in the transaxle case 221 is formed in the flange portion 110 of the front support 100. Further, a recessed portion 110c that communicates with the in-case oil passage 110b is formed in the inner peripheral surface of the through hole 110a of the front support 100. In the embodiment, the recessed portion 110c is formed in the inner peripheral surface of the flange portion 110 so as to be slightly recessed in the inner peripheral surface of the second boss portion 130. A shaft-side oil groove 28g is formed between the second boss portion 130 and the stator shaft 28. The shaft-side oil groove 28g is formed in the outer peripheral surface of the stator shaft 28 so as to communicate with the recessed portion 110c of the front support 100 and be positioned inside the second boss portion 130 to form a series of oil passages (second oil passage) together with the recessed portion 110c.

As illustrated in FIG. 4, the shaft-side oil groove 28g opens at the distal end of the second boss portion 130 to communicate with an oil passage 200 (first oil passage) defined between the inner peripheral surface of the tubular portion 292 of the impeller hub 29 and the outer peripheral surface of the stator shaft 28. The oil passage 200 communicates with the fluid transmission chamber 23a of the fluid transmission device 23 via a clearance between the impeller hub 29 and a constituent member of the one-way clutch 23o. In addition, the second boss portion 130 is inserted into the tubular portion 292 of the impeller hub 29 through the drive sprocket 71, and a seal member 94 is interposed between the inner peripheral surface of the tubular portion 292 of the impeller hub 29 and the outer peripheral surface of the second boss portion 130 of the front support 100 so as to overlap the bearing 95 on the inner side of the bearing 95 in the radial direction (so as to overlap the bearing 95 as seen in the radial direction). That is, the seal member 94 is disposed between the tubular portion 292 and the second boss portion 130 so as to be surrounded by the bearing 95 on the inner side of the bearing 95.

Consequently, in the power transfer device 20, the hydraulic control device 85 and the fluid transmission chamber 23a of the fluid transmission device 23 communicate with each other via the in-case oil passage 110b which is formed in the flange portion 110 of the front support 100, the recessed portion 110c, the shaft-side oil groove 28g which is formed in the outer peripheral surface of the stator shaft 28, and the oil passage 200. When the lock-up clutch 23c establishes lock-up, the in-case oil passage 110b, the recessed portion 110c, the shaft-side oil groove 28g, and the oil passage 200 are used as a lock-up on oil passage that supplies a hydraulic pressure from the hydraulic control device 85 to the fluid transmission chamber 23a. When the lock-up clutch 23c releases lock-up, meanwhile, working oil supplied from the lock-up off oil passage, that is, the oil passage 26a, to the lock-up chamber 23b in order to release lock-up of the lock-up clutch 23c flows back to the hydraulic control device 85 via the oil passage 200, the shaft-side oil groove 28g, the recessed portion 110c, and the in-case oil passage 110b.

With the shaft-side oil groove 28g formed in the outer peripheral surface of the stator shaft 28 as discussed above, it is no longer necessary that an oil passage that extends from the front support 100 side toward the fluid transmission device 23 side to constitute a part of the lock-up on oil passage should be formed on the outer side of the drive sprocket 71. Consequently, it is possible to suppress complication and an increase in wall thickness of the front support 100 and the converter housing 220 along with formation of an oil passage that constitutes a part of the lock-up on oil passage on the outer side of the drive sprocket 71, and an increase in number of components and number of man-hours for assembly due to provision of a seal member and machining of a bearing for an oil passage, for example.

In addition, with the recessed portion 110c formed in the inner peripheral surface of the through hole 110a, that is, the inner peripheral surface of the flange portion 110 of the front support 100, to communicate between the support portion oil passage and the fluid transmission chamber 23a of the fluid transmission device 23 via the recessed portion 110c and the shaft-side oil groove 28g of the stator shaft 28, oil grooves can be omitted from the second boss portion 130 as much as possible. Further, as illustrated in FIG. 4, with end portions of the input shaft 26 and the stator shaft 28 on the oil passage 200 side reduced in diameter compared to portions of the input shaft 26 and the stator shaft 28 located opposite to the oil passage 200 (portions inserted into the first boss portion 120), a sufficient oil passage cross-sectional area of the shaft-side oil groove 28g (second oil passage) can be secured even if oil grooves are omitted from the second boss portion 130. As a result, the second boss portion 130 can be thin-walled to suppress an increase in diameter of the drive sprocket 71 and the surrounding members, and hence to suppress an increase in size of the power transfer device 20. In the power transfer device 20, in addition, a bearing is not disposed at the middle of the lock-up on oil passage which is composed of the in-case oil passage 110b, the recessed portion 110c, the shaft-side oil groove 28g, and the oil passage 200, and thus it is possible to suppress leakage of working oil to the outside of the lock-up on oil passage via the bearing. Consequently, it is possible to keep the hydraulic pressure in the lock-up on oil passage, and hence the fluid transmission chamber 23a, at a suitable level.

In the power transfer device 20, further, the seal member 94 is interposed between the inner peripheral surface of the impeller hub 29 and the outer peripheral surface of the second boss portion 130. Thus, it is possible to suitably restrict an inflow of working oil that flows between the shaft-side oil groove 28g and the fluid transmission chamber 23a from the oil passage 200 between the impeller hub 29 and the stator shaft 28 toward the drive sprocket 71 using the seal member 94. Consequently, it is possible to suitably suppress application of a hydraulic pressure to the drive sprocket 71, which stably maintains the position of the drive sprocket 71 in the axial direction. In addition, with the drive sprocket 71 rotatably supported by the second boss portion 130 of the front support 100, and with the pump impeller 23p rotatably supported by the sidewall portion 220a of the converter housing 220 via the bearing 95 which is disposed on the outer peripheral side of the impeller hub 29, the seal member 94 which is interposed between the inner peripheral surface of the impeller hub 29 and the outer peripheral surface of the second boss portion 130 can be disposed so as to overlap the bearing 95 as seen in the radial direction. Consequently, the axial length of the power transfer device 20 can be shortened with the drive sprocket 71, the bearing 95, and the seal member 94 not arranged in the axial direction.

In the power transfer device 20, as has been described above, the sidewall portion 220a (first support portion) of the converter housing 220 and the front support 100 (second support portion) are disposed on the fluid transmission device 23 side and on the automatic transmission 25 side, respectively, across the chain drive mechanism 70. The drive sprocket 71 of the chain drive mechanism 70 is fitted to the tubular portion 292 of the impeller hub 29, which is fixed to the pump impeller 23p, so as to be relatively non-rotatable. In addition, the front support 100 includes the cylindrical second boss portion 130 which extends toward the chain drive mechanism 70 and which defines the through hole 110a to which the stator shaft 28 (sleeve member) is fixed, and the second boss portion 130 is inserted into the tubular portion 292 of the impeller hub 29 through the drive sprocket 71. Further, the oil passage 200 (first oil passage) which communicates with the fluid transmission chamber 23a is defined between the inner peripheral surface of the tubular portion 292 of the impeller hub 29 and the outer peripheral surface of the stator shaft 28, and the seal member 94 which restricts an inflow of working oil from the oil passage 200 is interposed between the tubular portion 292 of the impeller hub 29 and the second boss portion 130. The second oil passage which communicates with the in-case oil passage 110b (support portion oil passage) which is formed in the flange portion 110 of the front support 100 and the oil passage 200 is formed between the second boss portion 130 and the stator shaft 28 by the shaft-side oil groove 28g and the recessed portion 110c.

Consequently, an oil passage that connects between the fluid transmission chamber 23a and the in-case oil passage 110b of the front support 100, that is, the oil passage 200 (first oil passage) and the shaft-side oil groove 28g and the recessed portion 110c (second oil passage), can be formed between: the drive sprocket 71 and the impeller hub 29; and the stator shaft 28 in the radial direction. As a result, it is no longer necessary that an oil passage that connects between the fluid transmission chamber 23a and the in-case oil passage 110b should be formed on the outer side of the drive sprocket 71, which makes it possible to suppress an increase in wall thickness of the front support 100 along with formation of the oil passage, and an increase in number of components and number of man-hours for assembly due to provision of a seal member and machining of a bearing. Thus, it is possible to simplify the structure of an oil passage that supplies and discharges working oil to and from the fluid transmission device 23 (fluid transmission chamber 23a) while bypassing the drive sprocket 71 of the chain drive mechanism 70 which transfers power to the oil pump 60, and to achieve a reduction in size and weight of the power transfer device 20 and a cost reduction due to a reduction in number of components and number of man-hours for assembly.

In the power transfer device 20, in addition, the pump impeller 23p is rotatably supported by the sidewall portion 220a (first support portion) of the converter housing 220 via the bearing 95 which is disposed on the outer peripheral side of the tubular portion 292 of the impeller hub 29, and the seal member 94 is disposed so as to overlap the bearing 95 on the inner side of the bearing 95 in the radial direction. That is, with the second boss portion 130 of the front support 100 inserted into the tubular portion 292 of the impeller hub 29 through the drive sprocket 71, and with the pump impeller 23p rotatably supported by the sidewall portion 220a via the bearing 95 which is disposed on the outer peripheral side of the tubular portion 292, the seal member 94 and the bearing 95 can be disposed so as to overlap each other as seen in the radial direction. Consequently, the axial length of the power transfer device 20 can be shortened with the drive sprocket 71, the bearing 95, and the seal member 94 not arranged in the axial direction.

In the power transfer device 20, further, the recessed portion 110c is formed in the inner peripheral surface of the through hole 110a, that is, the inner peripheral surface of the flange portion 110 of the front support 100, and the in-case oil passage 110b and the fluid transmission chamber 23a of the fluid transmission device 23 communicate with each other via the recessed portion 110c and the shaft-side oil groove 28g which is formed in the outer peripheral surface of the stator shaft 28. Consequently, oil grooves can be omitted from the second boss portion 130 as much as possible, and the second boss portion 130 can be thin-walled to suppress an increase in diameter of the drive sprocket 71 and the surrounding members, and hence to suppress an increase in size of the power transfer device 20.

In the power transfer device 20, in addition, an inflow of working oil from the oil passage 200 which is defined by the impeller hub 29 and the stator shaft 28 toward the drive sprocket 71 can be suitably restricted by the seal member 94 between the inner peripheral surface of the impeller hub 29 and the outer peripheral surface of the second boss portion 130. Consequently, it is possible to suitably suppress application of a hydraulic pressure to the drive sprocket 71, which stably maintains the position of the drive sprocket 71 in the axial direction.

In the embodiment, the shaft-side oil groove 28g which communicates with the in-case oil passage 110b (recessed portion 110c) and the oil passage 200 is formed only in the outer peripheral surface of the stator shaft 28. However, the present disclosure is not limited thereto. That is, an oil groove that communicates with the in-case oil passage 110b (recessed portion 110c) and the oil passage 200 may be formed in the inner peripheral surface of the second boss portion 130 of the front support 100, and an oil groove that communicates with the in-case oil passage 110b (recessed portion 110c) and the oil passage 200 may be formed in both the outer peripheral surface of the stator shaft 28 and the inner peripheral surface of the second boss portion 130. In addition, the pump body 65 of the oil pump 60 may be formed from a body portion that includes the gear housing chamber 65a and a cover portion that covers an end surface of the body portion on the automatic transmission 25 side (left side in FIG. 4). In this case, the body portion and the flange portion 110 of the front support 100 may be formed integrally with each other.

In the embodiment, in addition, the drive sprocket 71 of the chain drive mechanism 70 is rotatably supported by the second boss portion 130 of the front support 100 via the bearing 90. However, the drive sprocket 71 may be supported by the impeller hub 29 which is coupled to the pump impeller 23p with the bearing 90 omitted.

Figure 6:
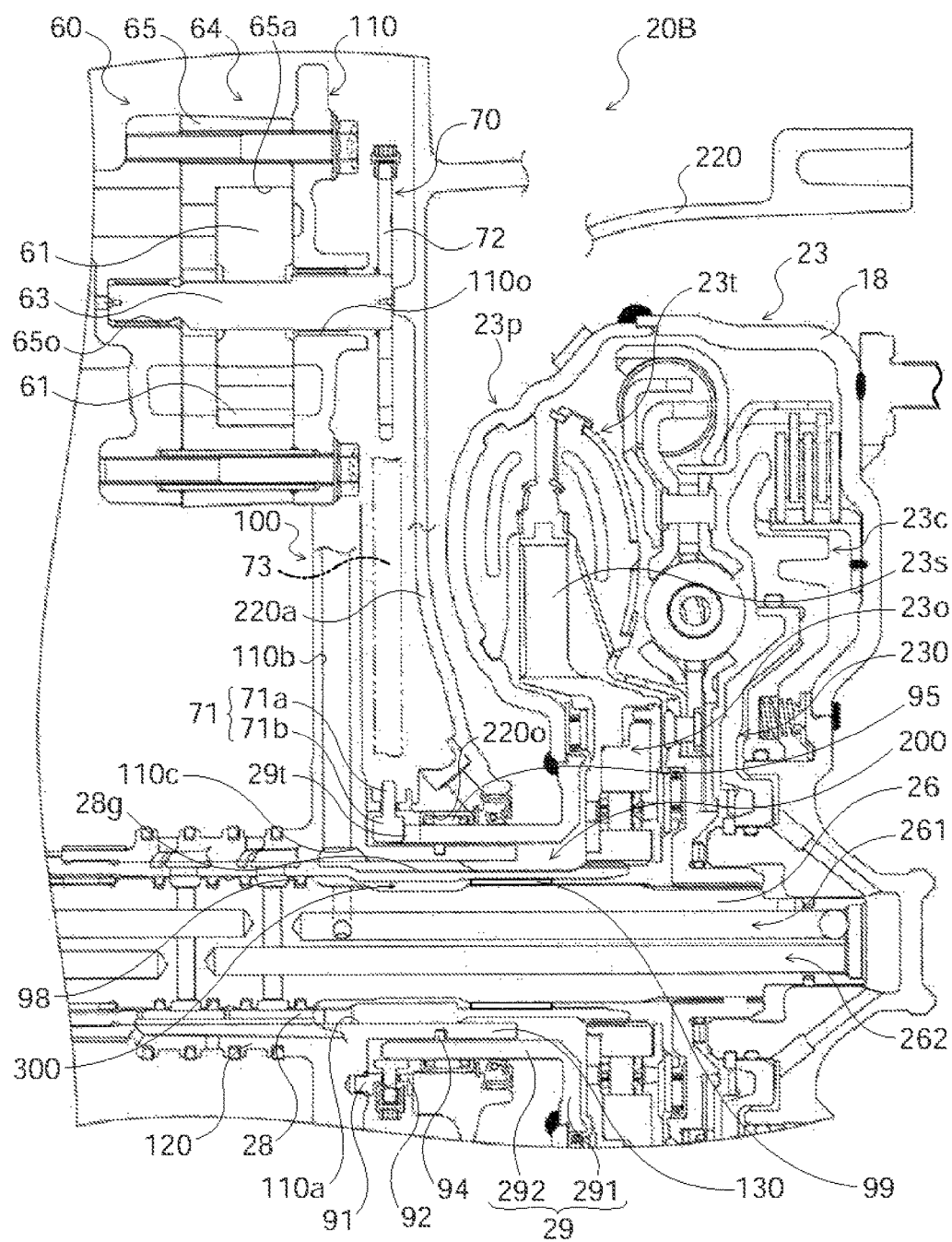
FIG. 6 is an enlarged view illustrating an essential portion of a power transfer device 20B according to a modification.

FIG. 6 is an enlarged view illustrating an essential portion of a power transfer device 20B according to a modification. Constituent elements of the power transfer device 20B that are identical to the elements of the power transfer device 20 discussed above are given the same numerals to omit redundant descriptions.

Also in the power transfer device 20B, as illustrated in FIG. 6, the recessed portion 110c which communicates with the in-case oil passage 110b (support portion oil passage) is formed in the inner peripheral surface of the through hole 110a (flange portion 110) of the front support 100, and the shaft-side oil groove 28g which communicates with the fluid transmission chamber 23a via the oil passage 200 (first oil passage) is formed in the outer peripheral surface of the stator shaft 28. The recessed portion 110c and the shaft-side oil groove 28g form a series of oil passages (second oil passage) that communicate with the in-case oil passage 110b and the fluid transmission chamber 23a. In the power transfer device 20B, in addition, the input shaft 26 is provided with a first in-shaft oil passage 261 that communicates with the fluid transmission chamber 23a. The first in-shaft oil passage 261 includes a first radial oil passage that opens in the vicinity of a center piece fixed to the front cover 18 and that communicates with the fluid transmission chamber 23a via a clearance between the center piece and a constituent member of the damper mechanism 23d etc., an axial oil passage that extends in the axial direction of the input shaft 26, and a second radial oil passage (see the broken lines in the drawing) that opens in the vicinity of the flange portion 110 of the front support 100.

Further, a communication oil passage 300 that communicates with the first in-shaft oil passage 261 (second radial oil passage) is defined between the outer peripheral surface of the input shaft 26 of the automatic transmission and the inner peripheral surface of the stator shaft 28 (sleeve member), and the communication oil passage 300 communicates with a second in-case oil passage (second support portion oil passage) (not illustrated) formed in the front support 100. In addition, a second seal member 98 is disposed between the input shaft 26 and the stator shaft 28 so as to restrict leakage of working oil from the communication oil passage 300 to the opposite side with respect to an end portion of the stator shaft 28 on the oil passage 200 (first oil passage) side. Additionally, a bush (slide bearing) 99 is disposed between the input shaft 26 and the stator shaft 28 so as to restrict leakage of working oil from the communication oil passage 300 toward an end portion of the stator shaft 28 on the oil passage 200 side at a location on the oil passage 200 side with respect to the second seal member 98. Consequently, the input shaft 26 is rotatably supported by the stator shaft 28 (and the front support 100) via the bush 99. End portions of the input shaft 26 and the stator shaft on the oil passage 200 side with respect to the second seal member 98 are reduced in diameter compared to portions of the input shaft 26 and the stator shaft located opposite to the oil passage 200 (portions inserted into the first boss portion 120).

In addition, the lock-up clutch 23c of the power transfer device 20B is constituted as a hydraulic multi-plate friction clutch that includes a plurality of friction engagement plates (friction plates and separator plates), a lock-up piston, an oil chamber defining member that defines an engagement oil chamber 230 together with the lock-up piston, a return spring, and so forth. Further, the input shaft 26 is provided with a second in-shaft oil passage 262 so as to communicate with the engagement oil chamber 230 of the lock-up clutch 23c. The second in-shaft oil passage 262 includes an axial oil passage that opens at an end portion of the input shaft 26 on the front cover side and that communicates with the engagement oil chamber 230 via an oil passage formed in the center piece, and a radial oil passage that penetrates the input shaft 26 on the first boss portion 120 side with respect to the flange portion 110 of the front support 100 and the second seal member 98 (opposite side with respect to the second boss portion 130).

The radial oil passage of the second in-shaft oil passage 262 communicates with a third in-case oil passage (third support portion oil passage) (not illustrated) formed in the front support 100 via an oil hole formed in the stator shaft 28. The third in-case oil passage is connected to the hydraulic control device 85. In addition, the second seal member 98 restricts a flow of working oil between the communication oil passage 300 which communicates with the first in-shaft oil passage 261, a communication portion of the oil hole of the stator shaft 28, and the second in-shaft oil passage 262. Consequently, working oil can be supplied and discharged from the hydraulic control device 85 to the engagement oil chamber 230 of the lock-up clutch 23c via the front support 100.

In the power transfer device 20B configured as discussed above, the fluid transmission chamber 23a of the fluid transmission device 23 communicates with the in-case oil passage 110b (support portion oil passage) of the front support 100 via the oil passage 200 (first oil passage), the shaft-side oil groove 28g and the recessed portion 110c (second oil passage), and communicates with the second in-case oil passage of the front support 100 via the first in-shaft oil passage 261 and the communication oil passage 300. Consequently, working oil can be supplied from the front support 100 to the fluid transmission chamber 23a, and working oil from the fluid transmission chamber 23a can be returned to the front support 100. In this case, one of the in-case oil passage 110b of the front support 100 and the second in-case oil passage is connected to the hydraulic control device 85, and the other is connected to the working oil storage portion 221a, for example.

Also in the power transfer device 20B, the in-case oil passage 110b and the fluid transmission chamber 23a can communicate with each other via the recessed portion 110c which is formed in the inner peripheral surface of the front support 100 and the shaft-side oil groove 28g which is formed in the outer peripheral surface of the stator shaft 28. Thus, oil grooves can be omitted from the second boss portion 130 as much as possible. Further, with end portions of the input shaft 26 and the stator shaft on the oil passage 200 side with respect to the second seal member 98 reduced in diameter, a sufficient oil passage cross-sectional area of the shaft-side oil groove 28g can be secured even if oil grooves are omitted from the second boss portion 130. As a result, the second boss portion 130 can be thin-walled to suppress an increase in diameter of the drive sprocket 71 and the surrounding members, and hence to suppress an increase in size of the power transfer device 20B.

In the exemplary embodiment described above, the fluid transmission device 23 which includes the pump impeller 23p which is connected to the engine, the turbine runner 23t which is connected to the input shaft 26 of the automatic transmission 25, and the fluid transmission chamber 23a in which power is transferred via working oil between the pump impeller 23p and the turbine runner 23t corresponds, for example to the "fluid transmission device". The oil pump 60 which is driven by power from the engine corresponds, for example, to the "oil pump". The chain drive mechanism 70 which includes the drive sprocket 71 which is coupled to the pump impeller 23p of the fluid transmission device 23, the driven sprocket 72 which is attached to the rotary shaft 63 of the oil pump 60, and the chain 73 which is wound around the drive sprocket 71 and the driven sprocket 72 corresponds to, for example, the "chain drive mechanism". The stator shaft 28 which rotatably supports the input shaft 26 of the automatic transmission 25 corresponds for example, to the "sleeve member". The hydraulic control device 85 which regulates the pressure of working oil discharged from the oil pump 60 to supply the working oil to the fluid transmission device 23 corresponds for example, to the "hydraulic control device". The transmission case 22 which houses the fluid transmission device 23, the automatic transmission 25, and the oil pump 60 corresponds for example, to the "case". The sidewall portion 220a of the converter housing 220 which is disposed on the fluid transmission device 23 side of the chain drive mechanism 70 corresponds, for example, to the "first support portion". The front support 100 which is disposed on the automatic transmission 25 side of the chain drive mechanism 70 corresponds for example, to the "second support portion". The cylindrical second boss portion 130 which extends from the flange portion 110 of the front support 100 toward the chain drive mechanism 70 and which defines the through hole 110a to which the stator shaft 28 is fixed corresponds for example, to the "boss portion". The impeller hub 29 which is fixed to the pump impeller 23p and which includes the tubular portion 292 to which the drive sprocket 71 of the chain drive mechanism 70 is fitted so as to be relatively non-rotatable corresponds for example to the "impeller hub". The oil passage 200 which is defined between the inner peripheral surface of the tubular portion 292 of the impeller hub 29 and the outer peripheral surface of the stator shaft 28 and which communicates with the fluid transmission chamber 23a corresponds for example, to the "first oil passage". The seal member 94 which is interposed between the tubular portion 292 of the impeller hub 29 and the second boss portion 130 and which restricts an inflow of working oil from the oil passage 200 corresponds for example, to the "seal member". The shaft-side oil groove 28g etc. which is formed between the second boss portion 130 and the stator shaft 28 and which communicates with the in-case oil passage 110b and the oil passage 200 corresponds for example to the "second oil passage".

While an exemplary embodiment has been described above, it is a matter of course that the present disclosure is not limited to the exemplary embodiment described above in any way, and that the present disclosure may be modified.

INDUSTRIAL APPLICABILITY

The present subject matter can be utilized, for example, in the power transfer device manufacturing industry etc.

The invention claimed is:
1. A power transfer device comprising: a fluid transmission device that includes a pump impeller connected to a motor, a turbine runner connected to an input shaft of a transmission, and a fluid transmission chamber in which power is transferred via working oil between the pump impeller and the turbine runner; an oil pump driven by power from the motor; a chain drive mechanism that includes a drive sprocket coupled to the pump impeller of the fluid transmission device, a driven sprocket attached to a rotary shaft of the oil pump, and a chain wound around the drive sprocket and the driven sprocket; a sleeve member that rotatably supports the input shaft of the transmission; and a case that houses the fluid transmission device, the transmission, and the oil pump, wherein
the case includes a first support portion and a second support portion disposed on the fluid transmission device side and on the transmission side, respectively, across the chain drive mechanism;
the second support portion includes a cylindrical boss portion that extends toward the chain drive mechanism and that defines a through hole to which the sleeve member is fixed;

the drive sprocket is fitted to a tubular portion of an impeller hub, which is fixed to the pump impeller, so as to be relatively non-rotatable;
the boss portion of the second support portion is inserted into the tubular portion of the impeller hub through the drive sprocket;
a first oil passage that communicates with the fluid transmission chamber is defined between an inner peripheral surface of the tubular portion of the impeller hub and an outer peripheral surface of the sleeve member;
a seal member that restricts an inflow of working oil from the first oil passage is disposed between the tubular portion of the impeller hub and the boss portion; and
a second oil passage that communicates with a support portion oil passage formed in the second support portion and the first oil passage is formed between the boss portion and the sleeve member.

2. The power transfer device according to claim 1, wherein
the pump impeller is rotatably supported by the first support portion via a bearing disposed on an outer peripheral side of the tubular portion of the impeller hub; and
the seal member is disposed so as to overlap the bearing on an inner side of the bearing in a radial direction.

3. The power transfer device according to claim 1, further comprising:
an in-shaft oil passage formed in the input shaft so as to communicate with the fluid transmission chamber;
a communication oil passage defined between an outer peripheral surface of the input shaft and an inner peripheral surface of the sleeve member so as to communicate between a second support portion oil passage formed in the second support portion and the in-shaft oil passage;
a second seal member disposed between the input shaft and the sleeve member so as to restrict leakage of working oil from the communication oil passage; and
a bush disposed on the first oil passage side with respect to the second seal member between the input shaft and the sleeve member so as to restrict leakage of working oil from the communication oil passage, wherein
end portions of the input shaft and the sleeve member on the first oil passage side with respect to the second seal member are reduced in diameter; and
the second oil passage includes a shaft-side oil groove formed in the outer peripheral surface of the sleeve member so as to communicate with the fluid transmission chamber, and a recessed portion formed in an inner peripheral surface of the second support portion so as to communicate with the support portion oil passage.

4. The power transfer device according to claim 3, further comprising:
a clutch that couples and decouples the motor and the input shaft of the transmission to and from each other; and
a second in-shaft oil passage formed in the input shaft so as to communicate with an engagement oil chamber of the clutch, wherein
the second support portion is provided with a third support portion oil passage that communicates with the second in-shaft oil passage via an oil hole formed in the sleeve member; and
the second seal member restricts a flow of working oil between: a communication portion between the second in-shaft oil passage and the oil hole of the sleeve member; and the communication oil passage.

5. The power transfer device according to claim 4, wherein:
the second support portion includes a flange portion that includes the support portion oil passage;
the boss portion extends from the flange portion toward the chain drive mechanism; and
the recessed portion is formed in an inner peripheral surface of the flange portion so as to communicate with the support portion oil passage.

6. The power transfer device according to claim 3, wherein:
the second support portion includes a flange portion that includes the support portion oil passage;
the boss portion extends from the flange portion toward the chain drive mechanism; and
the recessed portion is formed in an inner peripheral surface of the flange portion so as to communicate with the support portion oil passage.

7. The power transfer device according to claim 1, further comprising:
an in-shaft oil passage formed in the input shaft so as to communicate with the fluid transmission chamber;
a communication oil passage defined between an outer peripheral surface of the input shaft and an inner peripheral surface of the sleeve member so as to communicate between a second support portion oil passage formed in the second support portion and the in-shaft oil passage;
a second seal member disposed between the input shaft and the sleeve member so as to restrict leakage of working oil from the communication oil passage; and
a bush disposed on the first oil passage side with respect to the second seal member between the input shaft and the sleeve member so as to restrict leakage of working oil from the communication oil passage, wherein
end portions of the input shaft and the sleeve member on the first oil passage side with respect to the second seal member are reduced in diameter; and
the second oil passage includes a shaft-side oil groove formed in the outer peripheral surface of the sleeve member so as to communicate with the fluid transmission chamber, and a recessed portion formed in an inner peripheral surface of the second support portion so as to communicate with the support portion oil passage.

8. The power transfer device according to claim 7, further comprising:
a clutch that couples and decouples the motor and the input shaft of the transmission to and from each other; and
a second in-shaft oil passage formed in the input shaft so as to communicate with an engagement oil chamber of the clutch, wherein
the second support portion is provided with a third support portion oil passage that communicates with the second in-shaft oil passage via an oil hole formed in the sleeve member; and
the second seal member restricts a flow of working oil between: a communication portion between the second in-shaft oil passage and the oil hole of the sleeve member; and the communication oil passage.

9. The power transfer device according to claim 8, wherein:
the second support portion includes a flange portion that includes the support portion oil passage;

the boss portion extends from the flange portion toward the chain drive mechanism; and the recessed portion is formed in an inner peripheral surface of the flange portion so as to communicate with the support portion oil passage.

10. The power transfer device according to claim 7, wherein:

the second support portion includes a flange portion that includes the support portion oil passage;

the boss portion extends from the flange portion toward the chain drive mechanism; and the recessed portion is formed in an inner peripheral surface of the flange portion so as to communicate with the support portion oil passage.

* * * * *